United States Patent [19]

Ando et al.

[11] 4,004,760
[45] Jan. 25, 1977

[54] DEVICE FOR PREVENTING FOREIGN MATTERS FROM BEING SUCKED INTO A GAS TURBINE ENGINE FOR AN AIRCRAFT

[75] Inventors: Kiyoatsu Ando; Hiroshi Nakajima; Hiroshi Ueno, all of Nagoya, Japan

[73] Assignee: Mitsubishi Jukogyo Kabushiki Kaisha, Tokyo, Japan

[22] Filed: Mar. 25, 1975

[21] Appl. No.: 561,869

[52] U.S. Cl. .............. 244/53 B; 55/306; 60/39.09 P; 415/121 G
[51] Int. Cl.² ..................... B64D 33/02
[58] Field of Search ........... 244/53 B; 60/39.09 P; 415/121 G; 55/306, 422, DIG. 14

[56] References Cited
UNITED STATES PATENTS

| | | | |
|---|---|---|---|
| 3,338,049 | 8/1967 | Fernberger | 44/53 B X |
| 3,400,902 | 9/1968 | King | 244/53 B |
| 3,421,296 | 1/1969 | Beurer, Sr. | 244/53 B |
| 3,733,814 | 5/1973 | Hull et al. | 244/53 R X |

*Primary Examiner*—Trygve M. Blix
*Assistant Examiner*—Barry L. Kelmachter
*Attorney, Agent, or Firm*—Cushman, Darby & Cushman

[57] ABSTRACT

An improved deflector type of device for preventing suction of foreign matter into an air intake port of a gas turbine engine for an aircraft. The deflector is movable and by displacing said movable part to a desired position an intake air flow passageway of the engine can be varied. Thus, suction of foreign matter into a gas turbine engine during a flight under a freezing weather condition can be prevented without degrading air intake efficiency during a flight under a non-freezing environmental condition.

2 Claims, 13 Drawing Figures

DEVICE FOR PREVENTING FOREIGN MATTERS FROM BEING SUCKED INTO A GAS TURBINE ENGINE FOR AN AIRCRAFT

BACKGROUND OF THE INVENTION

The present invention relates in general to a device for preventing foreign matter from being sucked into a gas turbine engine, and more particularly, to improvements in such a device of deflector type.

Generally, a helicopter would often make a flight at a low speed, and it would often encounter a freezing weather as in a falling snow or in a cloud in winter. In such a case, sometimes, a front surface of an aircraft body may become icebound as shown at (a) in FIG. 1, and ice flakes are peeled off and sucked into a gas turbine engine (b), whereby an engine compressor may be damaged and the engine (b) may flame out. Consequently, regardless of whether it is for military use of for civil use, the employment of a helicopter in winter has been extremely limited, and this is a serious problem for a helicopter that is required to have an all-weather nature as is the case with rescue, anti-submarine operation, etc.

In order to resolve the aforementioned problem, various types of devices for preventing foreign matter from being sucked into a gas turbine engine of a helicopter have been heretofore developed. Wire gauze particle separator and deflector type prevention devices are known. However, the wire gauze type of device has a disadvantage that as a result of blocking of the mesh of the wire gauze by freezing the intake air of the engine might be possibly choked. Also the particle separator type of device has a disadvantage that the structure is complex and heavy in weight, and that under a freezing weather condition it is not practically useful, similarly to the wire gauze type of device. Still further, the conventional deflector type of device in which a deflector is fixedly mounted has a disadvantage that as a result of deflection of the intake air flow for the engine, the air intake efficiency of the engine is lowered, and thereby an engine output is lowered and a fuel consumption rate of the engine is increased.

SUMMARY OF THE INVENTION

Therefore, it is one object of the present invention to provide a novel device for preventing foreign matter from being sucked into a gas turbine engine, which is simple in structure, and which prevents the air intake efficiency of the engine from being lowered when there exists no fear of sucking in foreign matter, and also achieves a sufficient separation effect for foreign matter where there exists a fear of sucking in foreign matters.

According to one feature of the present invention, there is provided a deflector type of device for preventing suction of foreign matter into an intake port of a gas turbine engine for an aircraft such as, for example, a helicopter, characterized in that a part or a whole of the deflector is movable and by displacing said movable part to a desired position an intake air flow passageway of the engine can be varied.

Since the device for preventing suction of foreign matter according to the present invention has the above-described characteristic feature, when there exists a fear of sucking in foreign matter, said movable part is displaced to a position where an intake air is intercepted by said movable part, and thereby the foreign matter can be separated from the intake air of the engine by making use of the inertia possessed by the foreign matter.

On the other hand, when there exists no fear of sucking in foreign matter, said movable part is displaced to a position where the intake air is not intercepted by said movable part, to make the intake air smoothly flow into the gas turbine engine, and thereby the air intake efficiency of the engine can be maintained at a high level, the engine output can be increased, and the fuel consumption rate of the engine can be lowered.

In addition, according to the present invention, the improvement exists simply in that a part or a whole of a deflector type of device for preventing suction of foreign matters is modified so as to be movable, and therefore, the structure is very simple and its weight can be widely reduced.

BRIEF DESCRIPTION OF THE DRAWINGS

These and other features, objects and advantages of the present invention will become more apparent by reference to the following detailed description taken in conjunction with the accompanying drawings, in which.

DETAILED DESCRIPTION

Figure 8:
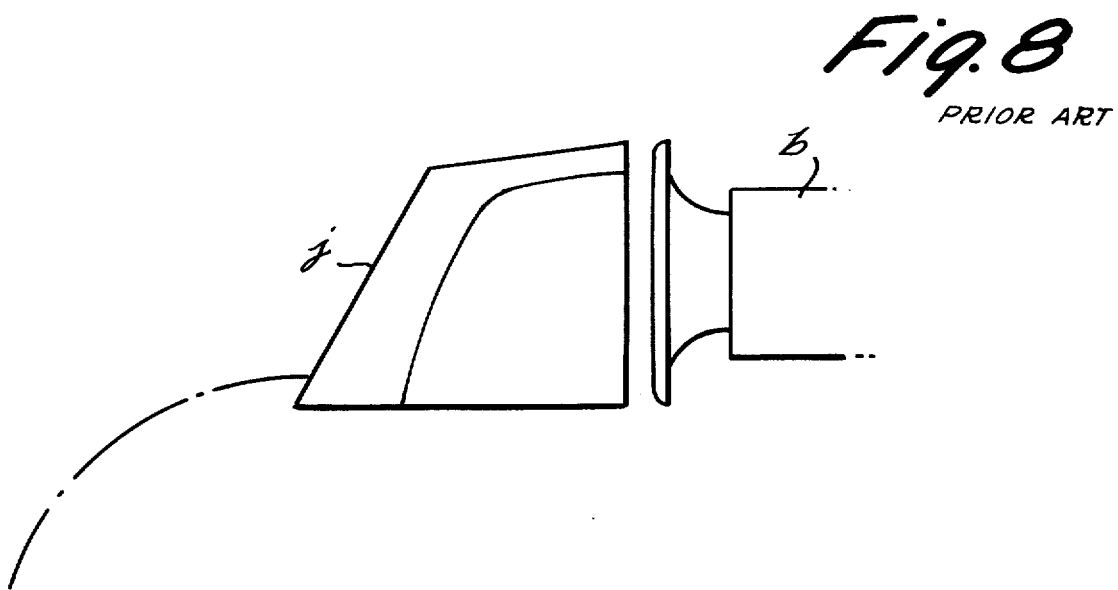
FIG. 8 is a side view of the same.
Figure 9A:
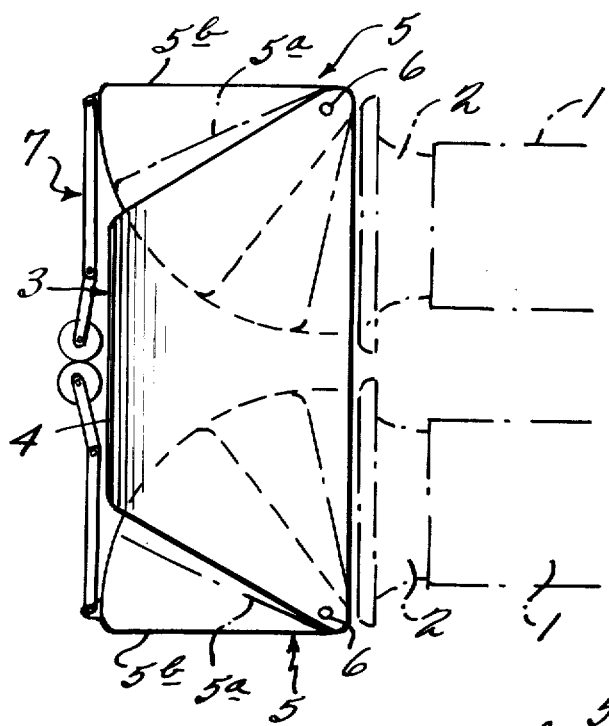
FIGS. 9A, 9B and 9C are a plan view, a side view and a front view, respectively, showing one preferred embodiment of a device for preventing suction of foreign matters into a gas turbine engine for use in an aircraft according to the present invention.
Figure 9B:
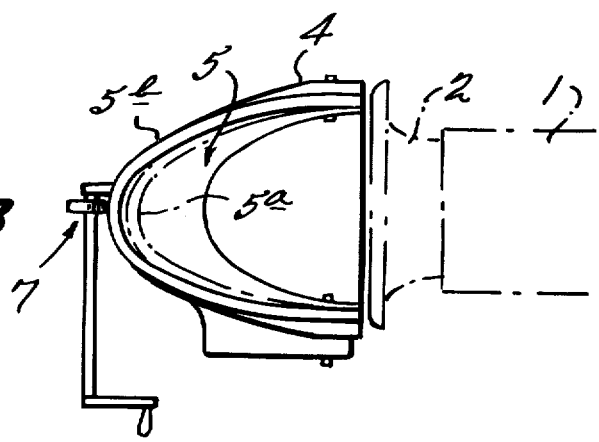
Figure 9C:
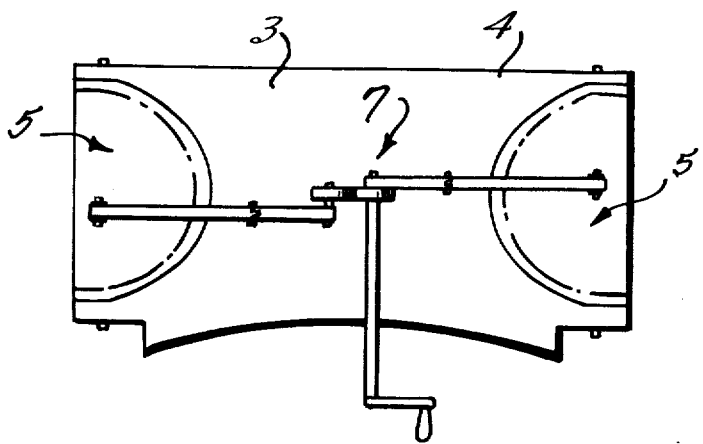
Figure 10:
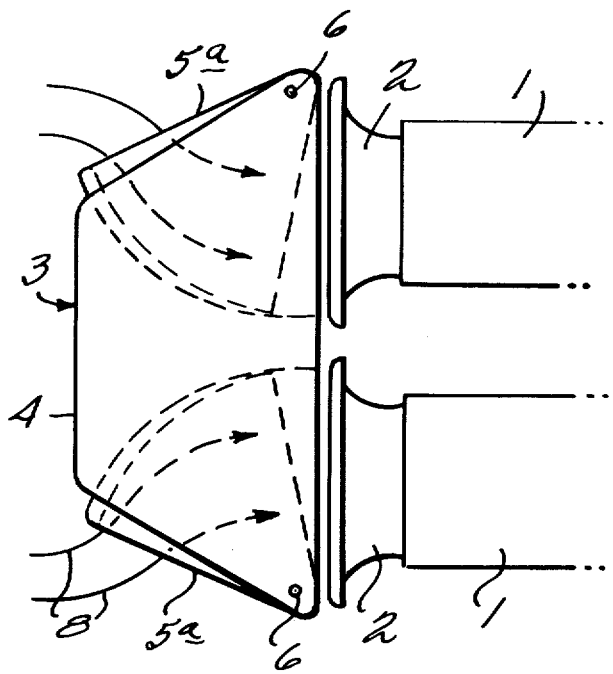
FIG. 10 is a plan view of the device shown in FIGS. 9A, 9B and 9C under the state where there is no possibility of sucking foreign matters.
Figure 11:
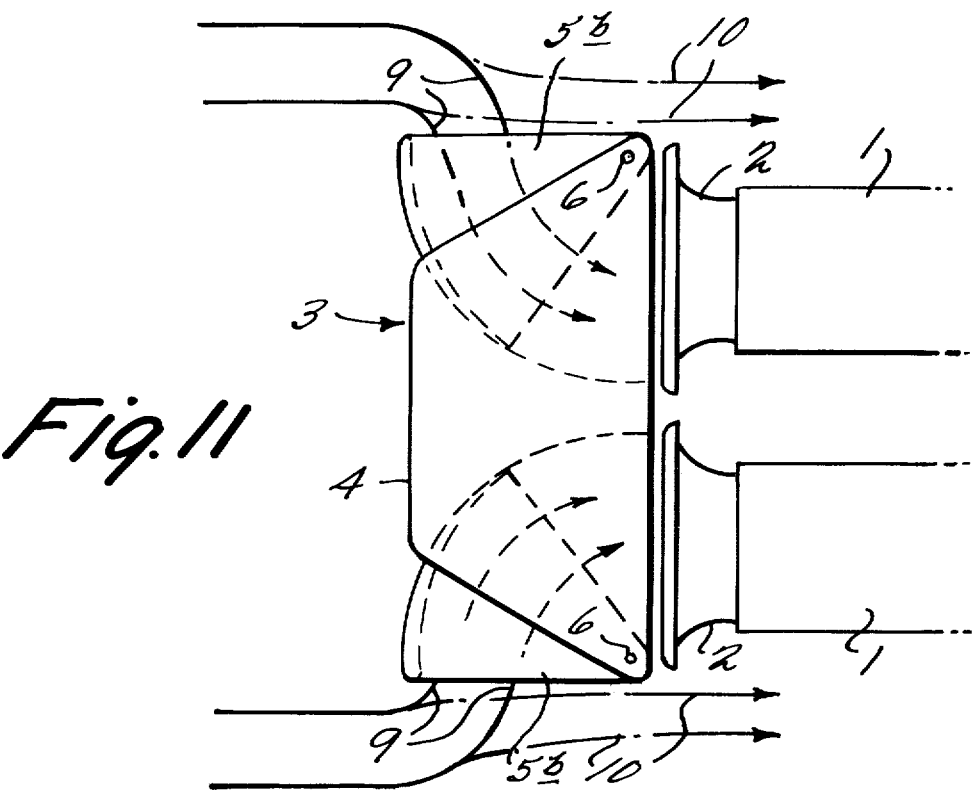
FIG. 11 is a plan view of the device shown in FIGS. 9A, 9B and 9C under the state where there is a fear of sucking foreign matters.

Now, before entering the detailed description of one preferred embodiment of the present invention, some description will be made of representatives of each of the three types of conventional devices for preventing suction of foreign matters into a gas turbine engine with reference to FIGS. 1 through 8, in order to facilitate understanding the present invention as illustrated in FIGS. 9 to 11.

1. THE PROBLEM

Figure 1:
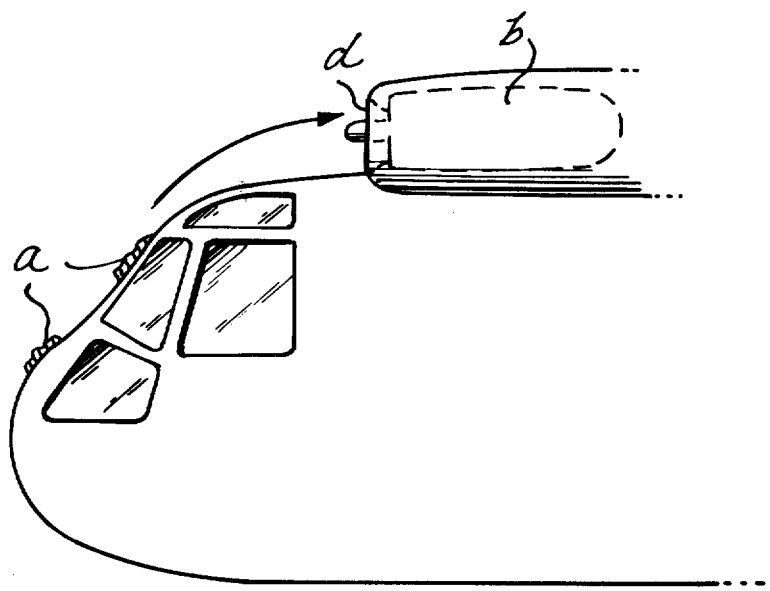
FIG. 1 is a partial schematic side view of a front portion of a helicopter showing the state where ice flakes frozen onto a front surface of the helicopter is peeling off and being sucked into an air intake port of an engine.

Referring to FIG. 1, when a helicopter or other aircraft makes a flight under a freezing weather condition in winter, the front end surface of the helicopter body would be often icebound as shown at ($a$) in FIG. 1, and the frozen ice flakes would occasionally peel off the front end surface and would be sucked into an air intake port ($d$) of a gas turbine engine ($b$). Such suction of foreign matter into the gas turbine engine would result in a damage of an engine compressor and thus sometimes the engine ($b$) would flame out.

2. THREE SOLUTIONS IN THE PRIOR ART

Figure 2:
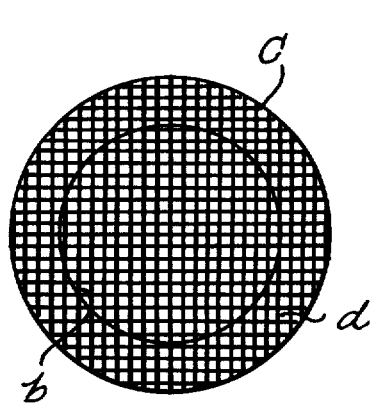
FIG. 2 is a front view of a conventional device for preventing suction of foreign matters into a gas turbine engine.
Figure 3:
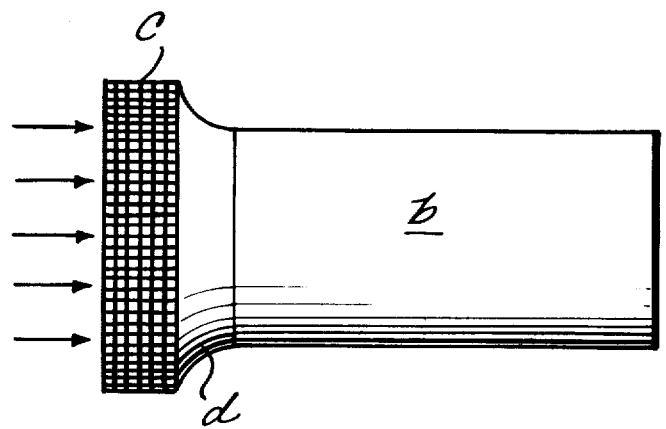
FIG. 3 is a side view of the same device.

A wire gauze type of device for preventing suction of foreign matter in the prior art is illustrated in FIGS. 2 and 3. In this device, a wire gauze ($c$) of the order of No. 8 mesh is mounted over an air intake port ($d$) of a gas turbine engine ($b$), and by this wire gauze ($c$) foreign matter larger than the mesh openings such as stones, birds, etc. is prevented from being sucked into the engine. While this type of device has the advantages that the structure is simple and light in weight and that the adverse effect upon the engine performance is small, it also has the disadvantages that the device is not effective for a fine dust, and that since there exists a fear of choking the intake air for the engine as a result of blocking of the meshes of the wire gauze ($c$) caused by freezing, the device is not practical for use under a freezing weather condition. More particularly, because of the large thermal conductivity of the wire gauze ($c$), an extremely large heat source is required for preventing freezing, so that its practicability is low and no example of practical use of the device of FIGS. 2 and 3 has been known.

Figure 4:
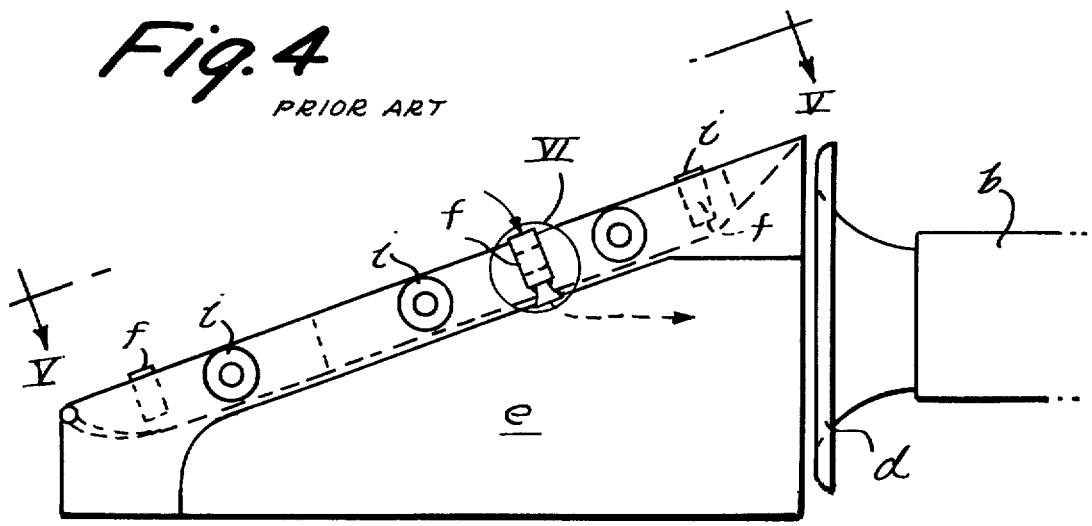
FIG. 4 is a side view of another type of conventional device for preventing suction of foreign matters.
Figure 5:
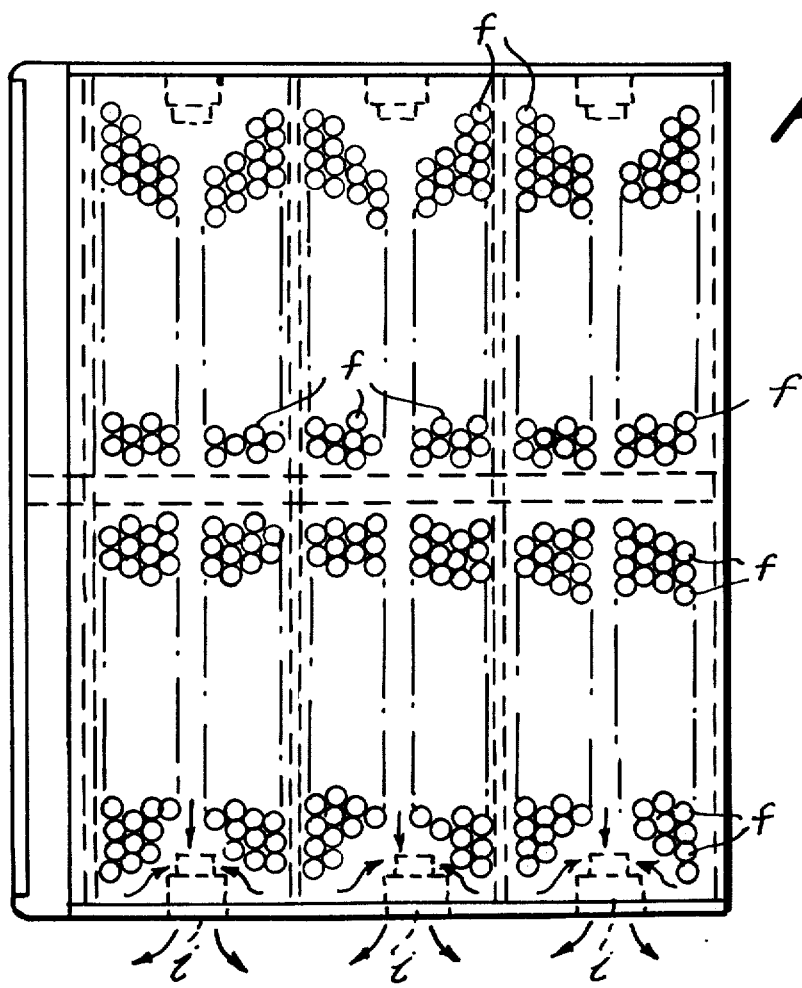
FIG. 5 is a top view of the same device taken along line V — V in FIG. 4 as viewed in the direction of arrows.
Figure 6:
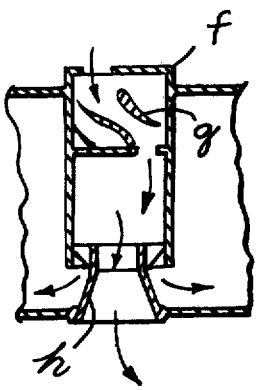
FIG. 6 is an enlarged longitudinal cross-section side view of the part encircled by a solid line VI in FIG. 4.

A particle separator type of device for preventing suction of foreign matter in the prior art is illustrated in FIGS. 4 to 6. In this device, a casing main body ($e$) is disposed in front of an air intake port ($d$) of a gas turbine engine ($b$). A large number of separator elements ($f$) are disposed obliquely forward and upward of said main body ($e$), fixed helix vanes ($g$) being provided at an upper portion of each said separator element ($f$) and a separating cylinder ($h$) being provided at a lower portion of the same. Air discharge openings ($i$) are provided along the side of the upper portion of the casing main body ($e$) in which said separator elements ($f$) are disposed. An air stream containing foreign matter, when sucked into the upper portion of said separator element ($f$), is caused to swirl by the fixed helix vanes ($g$), and an air stream that is rich in foreign matter is separated outwardly by the separating cylinder ($h$) owing to its centrifugal force to be discharged to the exterior through the discharge opening ($i$), while an air stream that is free from foreign matter passes through the bore of the separating cylinder ($h$) and is sucked into the gas turbine engine ($b$) via the casing main body ($e$). While this type of device has an excellent performance in that even a fine dust can be separated from an intake air stream for an engine, it has a disadvantage that the structure is complex and heavy in weight, and furthermore, it could not be practically used under a freezing weather condition similarly to the aforementioned wire gauze type of device.

Figure 7:
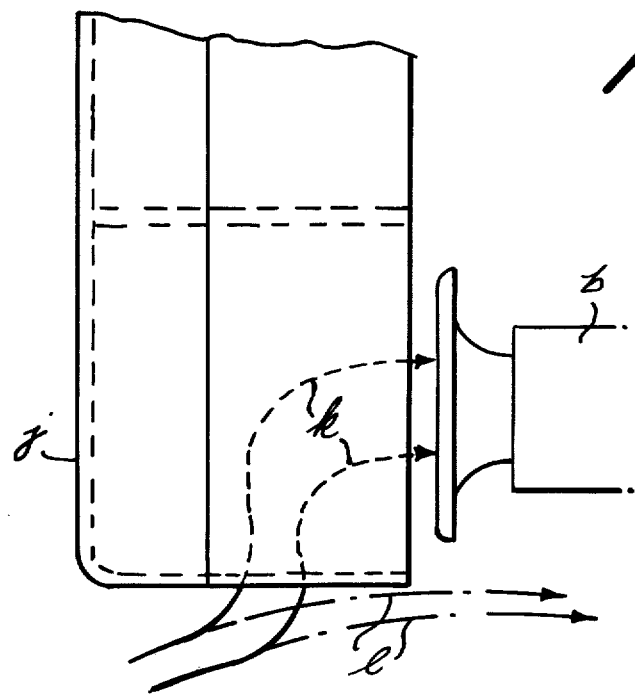
FIG. 7 is a plan view of a fixed deflector type of device for preventing suction of foreign matters in the prior art.

A conventional fixed deflector type of device for preventing suction of foreign matter in the prior art is illustrated in FIGS. 7 and 8. In this device, a fixed type of deflector ($j$), having a particular configuration as shown in FIGS. 7 and 8, is disposed in front of a gas turbine engine, and thereby an intake air for the engine is sucked into the engine ($b$) through a roundabout route as shown by solid lines ($k$), while relatively large foreign matter such as ice flakes, stones, etc. conveyed in association with the engine intake air can be separated from the engine intake air as shown by dotted lines ($l$) by making use of the inertia of the foreign matter. While this type of device is more excellent than the particle separator type of device as shown in FIGS. 4 to 6 in that the structure is simplified and light in weight, it has a disadvantage that as a natural result of bending an intake air flow for an engine, the air intake efficiency of the engine is lowered, and consequently, the output of the engine is also lowered and the fuel consumption rate of the engine is increased.

3. ONE PRESENTLY PREFERRED EMBODIMENT OF THE INVENTION

Referring now to FIGS. 9 through 11 of the drawings which show one preferred embodiment of the present invention, reference numeral 1 designates two gas turbine engines disposed in parallel on the top portion of a helicopter (not shown), and in front of an air intake port 2 of the gas turbine engine 1 is provided a movable deflector type of device 3 for preventing suction of foreign matter into the intake port according to the present invention.

The movable deflector type of device 3 for preventing suction of foreign matter into the air intake consists of a fixed portion 4 that is formed in a trapezoidal shape as viewed in a plan view, and a pair of left and right movable portions 5 pivotably mounted via hinges 6 at the rear end on the opposite sides of said fixed portion 4 so as to be freely rotated. The movable portions 5 are adapted to be displaced either to a retracted position 5$a$ or to an extended position 5$b$ by means of an actuator mechanism 7.

An operating end of the actuator mechanism 7 extends up to a pilot's seat of a helicopter (not shown), so that the actuator mechanism 7 can be manipulated at any time during a flight according to the pilot's will.

In addition, along the entire inner surface and a necessary part of the outer surface of the fixed portion 4 and the movable portions 5 are equipped with heating and anti-freezing devices (not shown) which make use of engine bleed air or of an electric heater.

Since the device illustrated in FIGS. 9 to 11 is constructed as described above, when a helicopter equipped therewith is making a flight under an environmental condition where there exists no fear of sucking foreign matter into the gas turbine engine, then the movable portions 5 of the device are set at the retracted position 5$a$ as shown in FIG. 10 by manipulating the actuator mechanism 7. Accordingly, the intake air flow to be sucked into the gas turbine engine 1 during a flight of the helicopter would be led smoothly as shown by solid lines 8, and thus the air intake efficiency of the engine is held at a high level. Since the intake air is sucked into the gas turbine engine 1 with a small resistance, reduction of the engine output can be prevented, and also the fuel consumption rate of the engine can remain lower. In other words, the fixed portion 3 is convex forwards and appears as a trapezoid in top plan, the larger base of the trapezoid being rearwards. This provides the fixed portion 3 with left and right ends that are "cutaway" relative to where they would be located if the fixed portion 3 were rectangular as seen in top plan. The hinges 6 are arranged in a vertically spaced pair, one pair near each rear apex of the trapezoid. The deflectors 5 are each sector shaped, part cylindrical members having an open inlet end, an open outlet end and an apex at one side, between the inlet end and outlet end. When the deflectors 5 are telescopically retracted (FIG. 10) by rotation about the pivots 6 located near the apexes of the deflectors 5, each air intake 2 is partially exposed directly forwards so some air can pass thereinto without being laterally deflected much. However, when the deflectors 5 are extended (FIG. 11), the effect of the cutaway ends of the stationary portion 4 is negated and all air must proceed substantially laterally, flankwise of the laterally outer extreme of each air intake 2 to proceed through the deflectors 5 to the air intake.

On the other hand, in case that the helicopter is making a flight under an environmental condition where there exists a fear of sucking foreign matter into the gas turbine engine 1, then the movable portions 5 of the device are set at the extended position 5b as shown in FIG. 11 by the pilot's manipulation of the actuator mechanism 7, and thereby the engine intake air flow is caused to bend as illustrated by solid lines 9 to be sucked into the gas turbine engine 1, while the foreign matter can be separated from the engine intake air flow as shown by dotted lines 10 by making use of the inertia possessed by the foreign matter.

In addition, in case the helicopter is making a flight under a freezing weather condition, the heating and anti-freezing devices equipped along the entire inner surface and a necessary part of the outer surface of the fixed portion 4 and movable portions 5 of the device 3, are actuated to prevent icebounding at the aboverefferred surface portions, and thereby the suction of foreign matter into the engine can be forestalled prevented.

The periods when a helicopter is making a flight under a condition where there exists a fear of sucking foreign matter into the engines through the air intake such as in freezing weather occupies a very small fraction of the total flight time, and therefore, the aviation efficiency of the helicopter according to the above-described embodiment is very high, and the device is economically very favorable.

Since many changes could be made in the above construction and many apparently widely different embodiments of this invention could be made without departing from the scope thereof, it is intended that all matters contained in the above description or shown in the accompanying drawings shall be interpreted as illustrative and not in a limiting sense.

What is claimed is:

1. A device for being mounted in front of an aircraft engine air intake to prevent foreign matter from being sucked into the engine, said device comprising;
   a first, fixed portion for extending as a deflector before the air intake and having a cutaway, open area for exposing at least part of the air intake to air flow directly ahead of the air intake;
   a second, movable portion having an inlet region communicating therethrough to an outlet region thereof, and a deflector region extending between the inlet region and outlet region; and
   pivot means mounting the second, movable portion upon the first, fixed portion for movement between these two positions:
   a. a first inactive position, wherein the outlet region of the movable portion is positioned directly ahead of the air intake, the deflector region thereof is substantially telescoped with said first, fixed portion so to substantially inactivate the deflecting ability of said deflector region, and wherein the inlet region of the movable portion is positioned directly ahead of the air intake, so that at least some of the air passing through said device to the air intake need not be substantially deflected to do so; and
   b. a second, active position, wherein the outlet region of the movable portion remains positioned directly ahead of the air intake, but the deflector region is extended across that part of the region directly ahead of the air intake that is exposed in said first, inactive position, and the inlet region of the movable portion is positioned directly ahead of one edge of the air intake, so that air to enter the air intake must first proceed substantially laterally.

2. The device of claim 1, wherein:
   the device is adapted to serve two horizontally, laterally adjacent air intakes, by having said first, fixed portion constituted by a curved member, convex forwards and obliquely relieved at means defining first and second open ends thereof so as to provide said cutaway area at each of said ends and so as to appear generally trapezoidal, larger base rearwards, as perceived in top plan; wherein said pivot means comprises two pairs of generally vertical axis pivots, one pair near each respective end of said larger base; and the second, movable portion comprises two such portions, each such portion being a curved, sector-shaped member having its inlet region at one lateral extreme, its outlet region at its opposite lateral extreme and an apex therebetween; each curved, sector-shaped member being secured to a respective pair of said pivots near the respective apex thereof.

* * * * *